(12) United States Patent
Lee

(10) Patent No.: US 9,003,403 B2
(45) Date of Patent: Apr. 7, 2015

(54) OPERATING METHODS FOR VIRTUAL MACHINE SERVER AND NODES BASED ON ROUND TRIP TIME (RTT) INFORMATION AND APPARATUSES THEREOF

(75) Inventor: Yong Ju Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 308 days.

(21) Appl. No.: 13/332,791

(22) Filed: Dec. 21, 2011

(65) Prior Publication Data

US 2012/0167086 A1 Jun. 28, 2012

(30) Foreign Application Priority Data

Dec. 22, 2010 (KR) .................. 10-2010-0132842

(51) Int. Cl.
*G06F 9/455* (2006.01)
*G06F 9/445* (2006.01)
*G06F 9/44* (2006.01)

(52) U.S. Cl.
CPC .......... *G06F 9/4405* (2013.01); *G06F 9/45504* (2013.01)

(58) Field of Classification Search
None
See application file for complete search history.

(56) References Cited

U.S. PATENT DOCUMENTS

2005/0262167 A1* 11/2005 Teodosiu et al. .............. 707/204
2010/0138827 A1* 6/2010 Frank et al. .................. 718/1

OTHER PUBLICATIONS

Dabek, Frank; A Distributed Hash Table, MIT 2005.*
Cox et al.; Pastiche: Making Backup Cheap and Easy; ACM SIGOPS Operating Systems Review—OSDI '02: Proceedings of the 5th symposium on Operating systems design and implementation vol. 36 Issue SI, Winter 2002 pp. 285-298.*
Jin et al.; The Effectiveness of Deduplication on Virtual Machine Disk Images, SYSTOR, May 2009.*
D. Nurmi et al, "The Eucalyptus open-source cloud-computing system", Proceedings of Cloud Computing and its Application, 2008, pp. 1-5.
Ignacio M. Llorente, "An Innovative Open Source Toolkit for Building Cloud Solutions", Cloud Computing and its Applications, Oct. 20, 2009, pp. 1-16.
Roger Curry et al, "ASPEN: an automated service provisioning environment for data centers", Proceedings of the 15$^{th}$ HP Software University Association Workshop, 2008.
Michael A. Kozuch et al, "Tashi: location-aware cluster management", ACDC, 2009.

* cited by examiner

*Primary Examiner* — Meng An
*Assistant Examiner* — Bing Zhao
(74) *Attorney, Agent, or Firm* — H.C. Park & Associates, PLC

(57) ABSTRACT

Disclosed are operating methods of a server and a node, and apparatuses thereof, and more particularly, to operating methods of a virtual machine server and a virtual machine node, and apparatuses thereof. The operating method of the virtual machine server according to the exemplary embodiment of the present invention includes: generating index information of blocks for booting a virtual machine in a virtual machine image; generating list information of neighboring nodes for a target node; and transferring the index information and the list information to the target node.

15 Claims, 5 Drawing Sheets

OPERATING METHODS FOR VIRTUAL MACHINE SERVER AND NODES BASED ON ROUND TRIP TIME (RTT) INFORMATION AND APPARATUSES THEREOF

CROSS REFERENCE TO RELATED APPLICATION

This application claims priority to and the benefit of Korean Patent Application No. 10-2010-0132842 filed in the Korean Intellectual Property Office on Dec. 22, 2010, the entire contents of which are incorporated herein by reference.

TECHNICAL FIELD

The present invention relates to operating methods for a server and a node and apparatuses thereof, and more particularly, to operating methods for a virtual machine server and a virtual machine node and apparatuses thereof.

BACKGROUND ART

With the development of a processor technology, an interest in a virtualization technology has steadily increased. Since an application program is developed depending on a hardware platform where an application program operates, the application program should be separately designed to be suitable for each hardware platform in spite of the same application program. Therefore, in order to develop an application program that does not depend on the hardware platform, a virtual machine generated by abstracting the hardware platform is developed. Virtualization is called a technology that can drive multiple operating systems on one physical server and virtualizing and driving the operating system is called a virtual machine (VM).

As an image managing method of the virtual machine in the related art, a file copy method and a network sharing method through a network file system (NFS) are used.

In the file copy method, the same image is duplicately copied to multiple nodes and the virtual machine is allocated one by one according to a user's request. In this method, an initial network cost is large, but a user just uses an image file of a local disk in use, and as a result, rapid booting is provided.

In the network sharing method through the NFS, there is no initial network cost, but a virtual machine image should be received through a network whenever the virtual machine is allocated to the user, and as a result, the network cost for use is large.

SUMMARY OF THE INVENTION

The present invention has been made in an effort to provide a method and an apparatus that enable rapid booting at the time of booting a virtual machine.

An exemplary embodiment of the present invention provides an operating method of a virtual machine server, including: generating index information of blocks for booting a virtual machine in a virtual machine image; generating list information of neighboring nodes for a target node; and transferring the index information and the list information to the target node.

Another exemplary embodiment of the present invention provides a virtual machine server, including: an index information generating unit generating index information of blocks for booting a virtual machine in a virtual machine image; a list information generating unit generating list information of neighboring nodes for a target node; and a transferring unit transferring the index information and the list information to the target node.

Yet another exemplary embodiment of the present invention provides an operating method of a virtual machine node, including: receiving list information of neighboring nodes from a virtual machine server; receiving blocks used to boot a virtual machine from the neighboring nodes based on the list information; and booting the virtual machine by using the received blocks.

Still another exemplary embodiment of the present invention provides a virtual machine node, including: a receiving unit receiving list information of neighboring nodes from a virtual machine server and receiving blocks used to boot a virtual machine from the neighboring nodes based on the list information; and a booting processing unit booting a virtual machine by using the received blocks.

According to the exemplary embodiments of the present invention, rapid booting is enabled at the time of booting the virtual machine. In particular, in the case where the virtual machine is used for each user, the booting time can be remarkably reduced in congestion of users.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
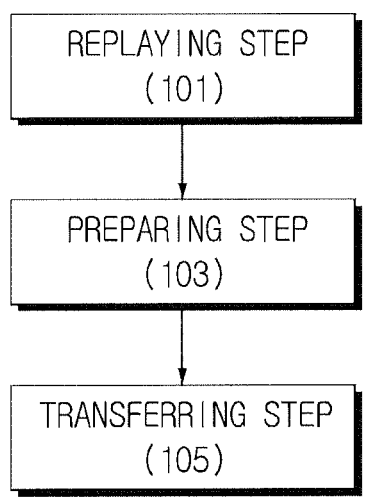
FIG. 1 is a diagram for illustrating a virtual machine system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. In the following descriptions and accompanying drawings, like reference numerals substantially refer to like elements, and as a result, a duplicated description will be omitted. Further, in describing exemplary embodiments of the present invention, well-known functions or constructions will not be described in detail since they may unnecessarily obscure the understanding of the present invention.

In the exemplary embodiments disclosed in the specification, when a virtual machine is booted, booting is performed by receiving a booting image from a neighboring node to enable rapid booting. That is, sequential data of blocks required for booting are constructed with indexes by studying a reading pattern of a virtual machine image in advance to receive and recycle a booting image in a neighboring node between other virtual machines rather than reading data through a disk or network randomly for every booting, thereby enabling rapid booting.

The exemplary embodiments disclosed in the specification may be implemented under a cloud computing environment which is a technology of integrating and providing computing resources by using a virtualization technology and a block reading sequence in the virtual machine image required for booting the virtual machine is studied through replaying the virtual machine image, and as a result, an image part of a corresponding block possessed by the neighboring node is received to maximize reading performance of the virtual machine image that exists on the network and provide rapid booting.

Table 1 described below is used to describe a technical difference between a file copy method and an NFS method used in the related art and the method presented in the specification and comparison elements depend on an image transmission method and an image size.

TABLE 1

|  | Related art | The present specification |
|---|---|---|
| Image transferring method | File-copying existing image or using network transfer using NFS | Learning common part of existing virtual machine image used to boot virtual machine to receive corresponding part from neighboring node |
| Image size | N times larger than size of virtual machine for each user | Reduced as large as size of common part by sharing common part of existing virtual machine image |

In the exemplary embodiments disclosed in the specification, the virtual machine may be allocated for each user and a system area in the virtual machine image required for booting is separately managed. Herein, a master boot record, a kernel image, system software, and the like may correspond to the system area. To this end, a method of reordering the virtual machine image and a method of finding the neighboring node may be adopted. The method of reordering the virtual machine image and the method of finding the neighboring node will be described in detail.

FIG. 1 is a diagram for describing a virtual machine system according to an exemplary embodiment of the present invention.

Referring to FIG. 1, the virtual machine system may include a virtual machine server and a virtual machine node. The node may include a node to read blocks required for booting and a node to be newly booted. The virtual machine system may be operated according to a replaying step 101, a preparing step 103, and a transferring step 105.

In the replaying step 101, index information for a virtual disk image (alternately, blocks constituting the virtual disk image) is generated by processing the (original) virtual machine image. The virtual disk image is compared with the virtual machine image in the related art and will be described in detail in FIG. 2. In the preparing step 103, list information regarding neighboring node(s) is generated. The index information and the list information are generated in the virtual machine server to be transmitted to the node to be newly booted. Next, in the transferring step 105, the node to be newly booted receives blocks depending on the index information from the virtual machine server or the neighboring node(s) to finally receive the virtual disk image and perform booting by using the received virtual disk image. Hereinafter, each step will be described in detail.

In the replaying step 101, a hint file is prepared in order to acquire a list of blocks required to boot the virtual machine in the virtual machine image. Therefore, node(s) where reading is made may easily transfer their own blocks to node(s) to be newly booted.

In the preparing step 103, as the step of finding the neighboring virtual machine node(s), a network access cost to nodes is calculated in the virtual machine server and provided to node(s) to be newly added and booted.

In the transferring step 105, the node to be newly added and booted requests its required block to the virtual machine server and (or) neighboring node(s) based on a required block number and a list of neighboring nodes. Therefore, smooth booting image areas may be generally distributed in a list group of neighboring nodes. Meanwhile, when other neighboring node(s) have required blocks, the newly added node may provide the required blocks.

Figure 2:
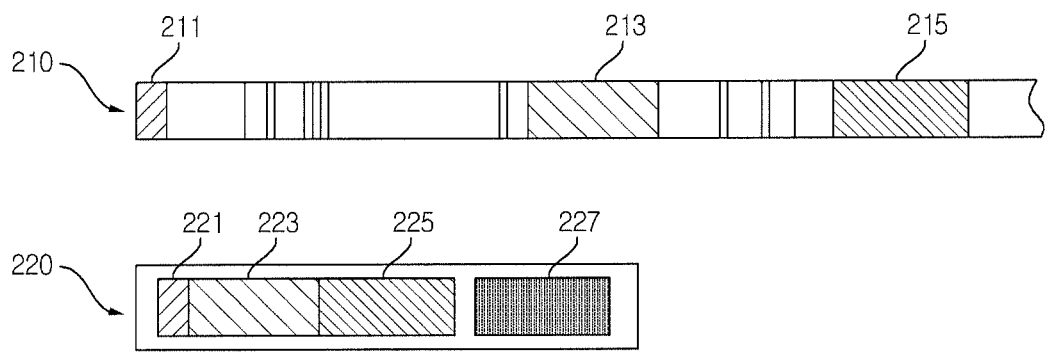
FIG. 2 is a diagram for comparing a virtual disk image with a virtual machine image.

FIG. 2 is a diagram for comparing a virtual disk image with a virtual machine image.

Referring to FIG. 2, reference numeral 210 represents a diagram logically showing a file stored in the virtual machine image. Since an operating system is installed even in the virtual machine, a first block of the file as a master boot record 211 includes system information and a kernel image area 215 exists at a next predetermined position. The node reads the master boot record 211 and the kernel image 215 to perform a basic booting procedure and accesses a predetermined position of a library or start programs 213 which are required in booting randomly to read the library or start programs 213 as necessary.

This is a common system area to all of multiple users and individual users read the same area (block) to boot the system.

When the common system area is configured by one virtual disk image, a block accessing time and a transferring time can be minimized.

This concept is reflected to reference numeral 220. Reference numeral 220 represents one generated by gathering the common system areas 221, 223, and 225: blocks having the same patterns are the same as each other in reference numerals 210 and 220) and a black block 227 at a rear end may be user data such as a document or contents. In order to implement one virtual disk image 220, index information regarding the blocks 221, 223, 225, and 227 constituting the virtual disk image 220 should be generated. The index information may be recorded in a hint file type. Such a series of processes correspond to the replaying step 101 described in FIG. 1.

The index information may include information in which positions of blocks read by booting an image with the virtual machine through an emulator are recorded in sequence.

Meanwhile, the index information may include information for transmitting the virtual disk image 220 in one sequential streaming format.

Figure 3:
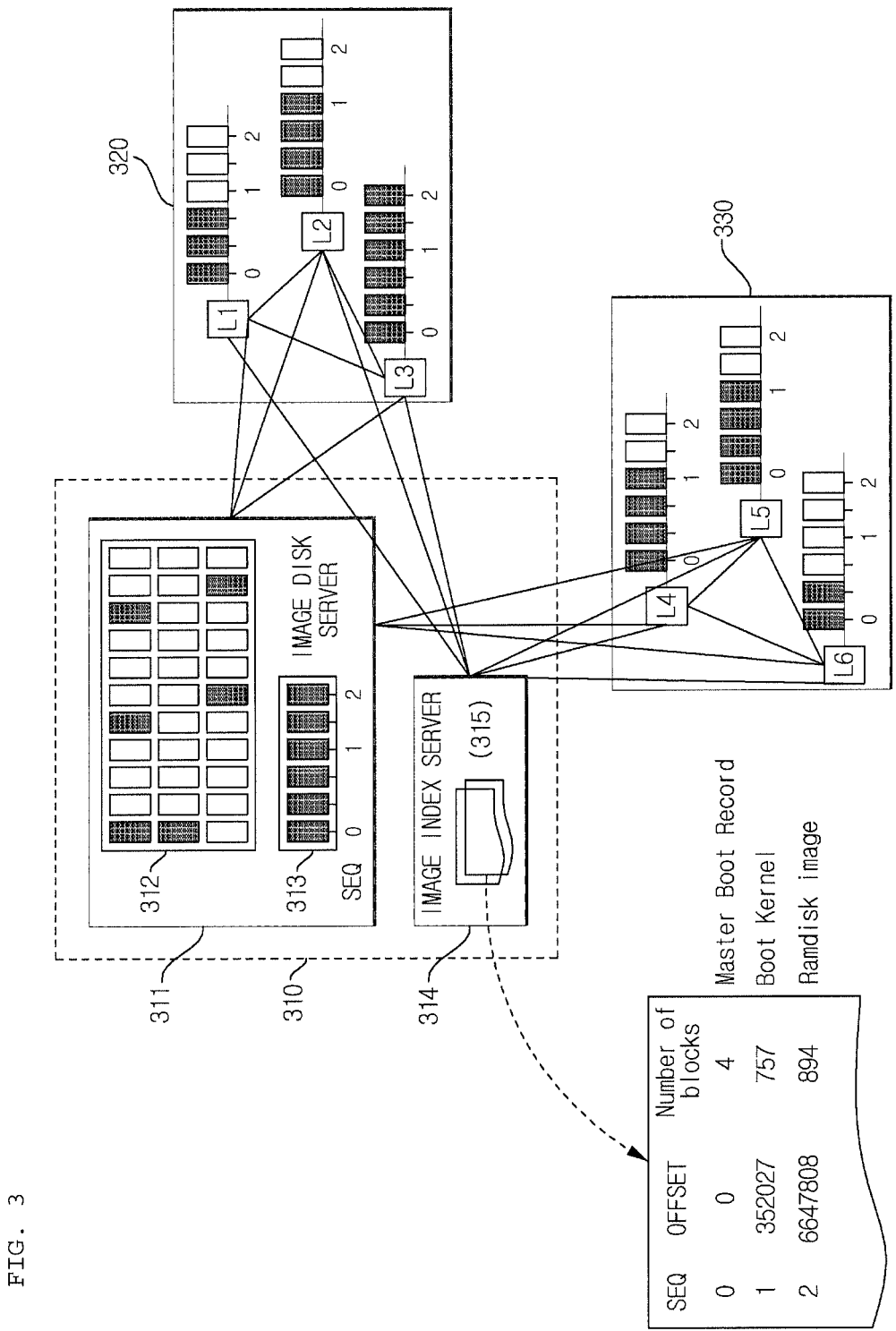
FIG. 3 is a diagram for illustrating a configuration of a virtual machine system and a hint file.

FIG. 3 is a diagram illustrating a configuration of a virtual machine system and a hint file.

Referring to FIG. 3, the virtual machine system includes a virtual machine server 310 and nodes L1 to L6. The virtual machine server 310 may include an image disk server 311 and an image index server 314 and the nodes L1 to L6 include nodes (nodes which are being booted at present or nodes having blocks for booting: L1 to L5) which are accessing the virtual machine server 310 at present and a node (a node which will be newly booted: L6) which intends to access the virtual machine server 310. The nodes L4 and L5 adjacent to the node L6 which intends to access the virtual machine server 310 and the nodes L1 to L3 not adjacent to the node L6 are represented by circles 320 and 330 shown in dotted lines.

The virtual machine image 312 exists in the image disk server 311 and the virtual machine image 312 is reordered as the virtual disk image 313. Black-pattern blocks correspond to the system areas and are the blocks required for booting in the nodes L1 to L6. The image index server 314 stores a hint file 315.

The hint file may include information on a sequence SEQ, an offset for a position, and the number of blocks. In an example of the hint file of FIG. 3, sequences 0, 1, and 2 include index information of blocks corresponding to a master boot record, a boot kernel, and a ram disk image, respectively.

The node L6 which will be newly booted through the virtual machine image 312 first accesses the image index server 315 to receive the hint file 315 including the index information for booting the virtual machine and receive list information regarding the neighboring nodes L1 to L5. In FIG. 3, the nodes L4 and L5 are selected as the nodes adjacent to the node L6 that will perform booting. This process corresponds to the preparing step 103 in FIG. 1.

The node L6 that will perform booting receives the hint file 315 and the list information regarding the neighboring nodes L4 and L5 from the virtual machine server 310 and requests the neighboring nodes L4 and L5 for the blocks required for booting based on the received hint file 315 and the list information. The requested blocks may be sequentially received in a virtual image format or in the streaming format. This process corresponds to the transferring step 105 in FIG. 1.

In each of the nodes L1 to L5 of FIG. 3, the blocks received to correspond to the sequences 0, 1, and 2 are shown by the black patterns and a check mark V indicates a present reading position.

Figure 4:
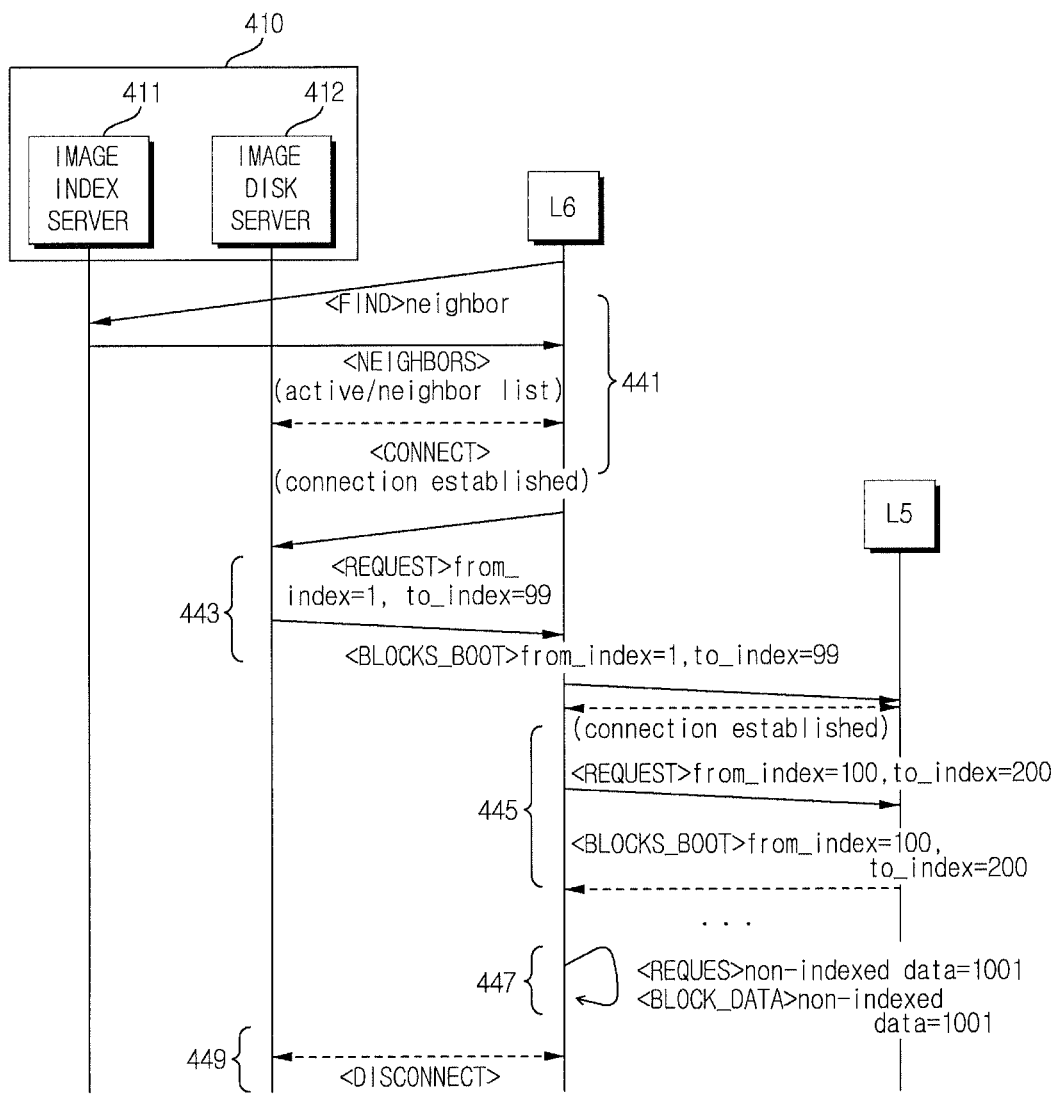
FIG. 4 is a diagram for illustrating one example of a transferring protocol based on FIG. 3.

FIG. 4 is a diagram for illustrating one example of a transferring protocol based on FIG. 3.

Referring to FIG. 4, the virtual machine system includes a virtual machine server 410 and the node L6 that will perform booting and the neighboring nodes L4 and L5. However, in FIG. 4, the neighboring node of L4 will be omitted by considering complexity of the figure. The virtual machine server 410 may include an image index server 411 and an image disk server 412. However, the classification is just one example, but is not limited thereto.

Table 2 shown below describes an example of a message communication protocol of the transferring protocol in the virtual machine system.

TABLE 2

| Message Header | Contents |
|---|---|
| <FIND> | Request list of neighboring nodes. |
| <NEIGHBORS> | Return list of node most adjacent to requested node by measuring round trip time (RTT) of nodes accessing index server. |

TABLE 2-continued

| Message Header | Contents |
|---|---|
| <CONNECT> | Access neighboring nodes. |
| <REQEUST BLOCKS> From__index = A, to__inex = B | Request neighboring node for blocks with index number of required block (continuously transfer blocks between sections A and B in streaming format). |
| <BLOCKS__BOOT> | Notify that requested data is booting related data and transfer requested data together with blocks. |
| <BLOCK__DATA> | Notify that requested data is user data and return data to node. |
| <DISCONNECT> | Disconnect neighboring node. |

The node L6 that will perform booting requests the image index server 411 for the neighboring node list and the image index server 411 transfers the list information on the nodes which is accessing the index server at present and the neighboring nodes to the node L6 that will perform booting (441). Herein, a list Active List of the nodes which is accessing the index server at present includes L1 to L5 and a list Neighbor List of the neighboring nodes is divided into a group constituted by L1 to L3 and a group constituted by L4 and L5. The group constituted by L4 and L5 therebetween corresponds to the neighboring nodes.

L6 is newly added to the group constituted by L4 and L5 of the list of the neighboring nodes while the node L6 which will perform booting newly participates in the group and booting is performed by requesting the blocks required for the image disk server 412 and L4 and L5 (443, 445, 447, and 449).

The node L6 which will perform booting accesses the image disk server 412 to request and receive the blocks based on the index information (443).

Subsequently, the node L6 which will perform booting requests the neighboring node L5 for a block of an order subsequent to the blocks received from the image disk server 412 and receives the blocks from the neighboring node L5 (445).

Although not shown, the node L6 which will perform booting requests and receives blocks from an order subsequent to the blocks received from the neighboring node L5 to and from another neighboring node L4.

When requested data is user data, accessing is terminated (447 and 449). When the requested data is the user data, rapid access is available due to access to a local disk (for example, a USB disk type).

L6 is added to the group constituted by L4 and L5 the list of the neighboring nodes while the node L6 which will perform booting newly participates in the group.

Hereinafter, an exemplary embodiment of an operating method of the virtual machine server and an operating method of a virtual machine node and the server and the node will be described separately.

<Operating Methods of Virtual Machine Server and Node>

Figure 5:
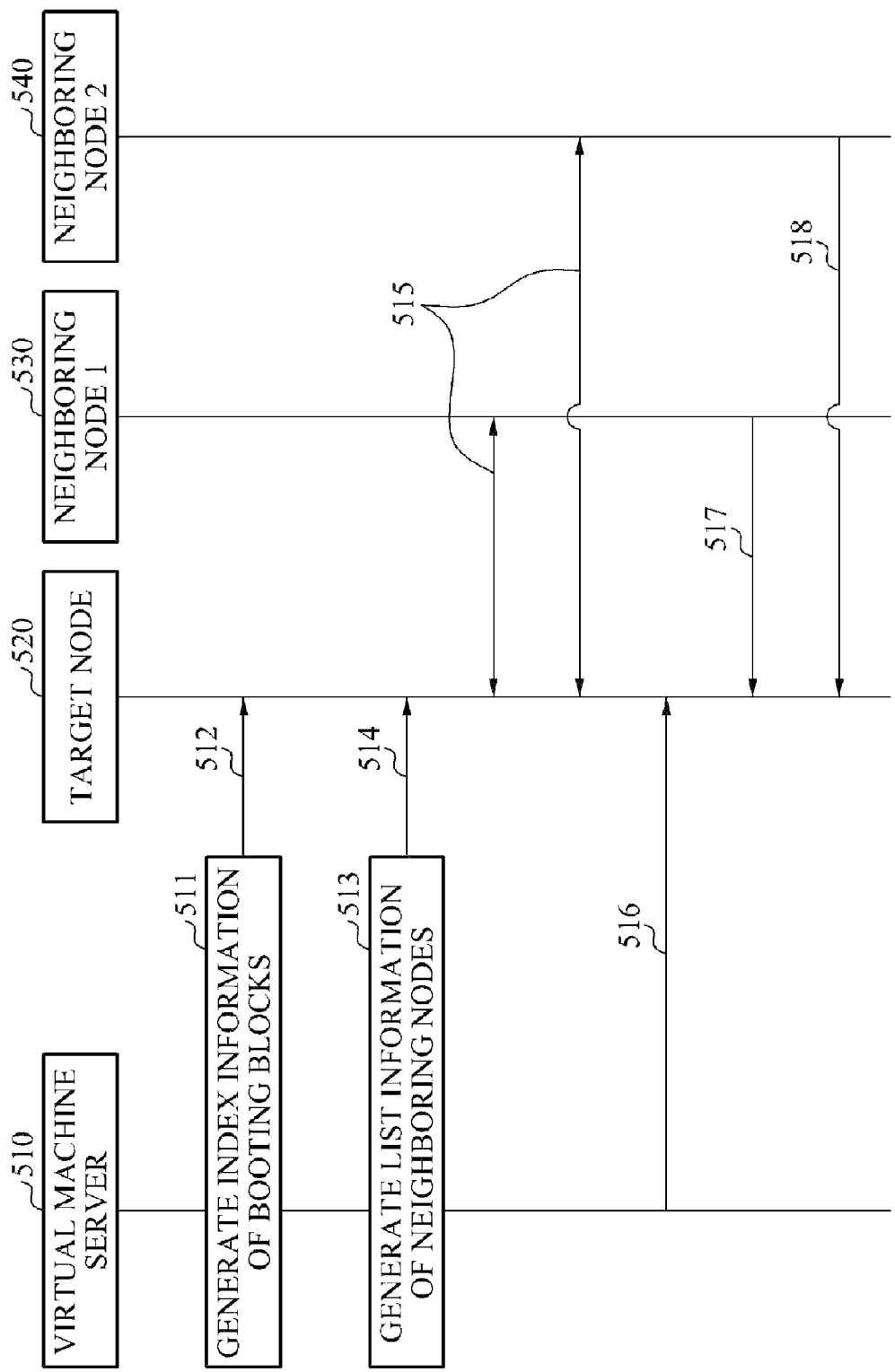
FIG. 5 is a diagram for illustrating exemplary embodiments of operating methods of a virtual machine server and a virtual machine node.

FIG. 5 is a diagram for illustrating exemplary embodiments of operating methods of a virtual machine server and a virtual machine node.

Referring to FIG. 5, the operating method of the virtual machine server includes generating index information of blocks for booting a virtual machine in a virtual machine image (511), generating list information of neighboring nodes 530 and 540 with respect to a target node (513), and transferring the index information and the list information to the target node 520 (512 and 514). Herein, the booting of the virtual machine may include system booting of the virtual machine.

The index information may include sequence information of blocks required for booting the virtual machine and herein, the sequence information may include sequential information on the positions of blocks read at the time of booting a virtual machine image through an emulator.

The list information may be generated based on a measurement value of a round trip time (RTT) for nodes that access the virtual machine server.

The target node 520 requests the neighboring nodes 530 and 540 for the blocks for booting the virtual machine according to the index information and the list information (515) to receive the blocks in sequence and herein, the received blocks may be received from the virtual machine server 510 and the neighboring nodes 530 and 540 in a sequential streaming format (516 to 518).

The neighboring nodes 530 and 540 may include a node that accesses the virtual machine server 510 to boot the virtual machine.

Referring to FIG. 5, the operating method of the virtual machine node includes a list information receiving step (514) of receiving the list information of the neighboring nodes 530 and 540 from the virtual machine server 510, a block receiving step (516 to 518) of receiving the blocks used to boot the virtual machine from the neighboring nodes 530 and 540 based on the list information, and a booting step of booting the virtual machine by using the received blocks.

Meanwhile, the operating method of the virtual machine node may further include an index information receiving step (512) of receiving the index information of the sequential blocks for booting the virtual machine in the virtual machine image. Herein, the booting of the virtual machine may include system booting of the virtual machine.

The index information may include sequence information of blocks required for booting the virtual machine and herein, the sequence information may include sequential information on the positions of blocks read at the time of booting a virtual machine image through an emulator.

The list information may be generated based on a measurement value of a round trip time (RTT) for nodes that access the virtual machine server (513).

In the block receiving step (516 to 518), the blocks for booting the virtual machine may be received from the neighboring nodes 530 and 540 in sequence according to the index information and the list information and the received blocks may be received from the neighboring nodes 530 and 540 in a sequential streaming format.

The neighboring nodes 530 and 540 may include a node that accesses the virtual machine server 510 to boot the virtual machine.

Figure 6:
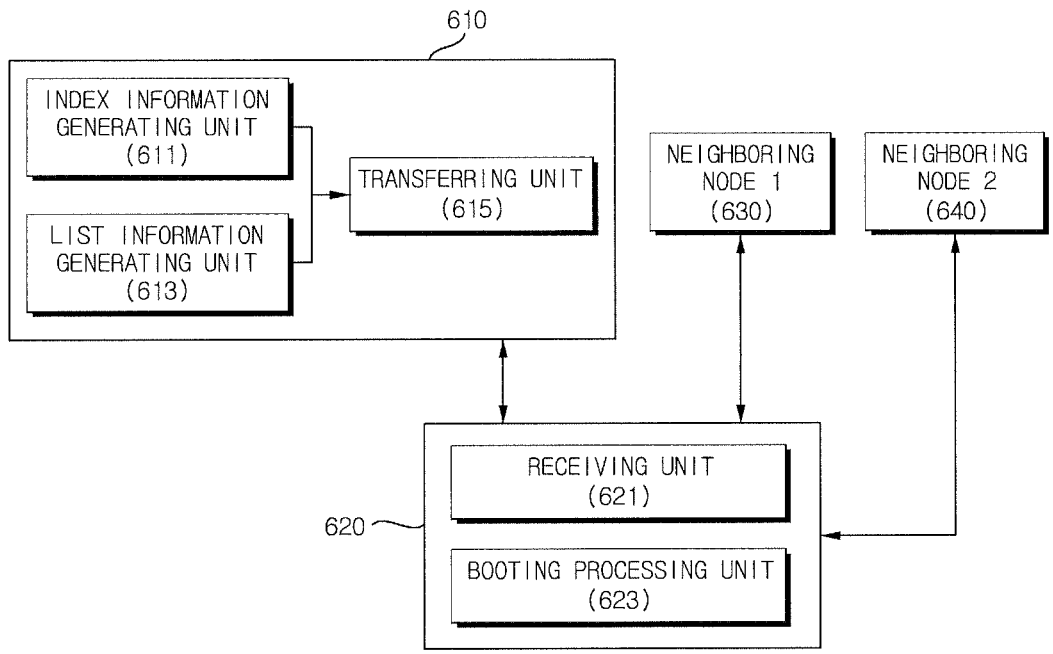
FIG. 6 is a diagram for illustrating exemplary embodiments of a virtual machine server and a virtual machine node.

FIG. 6 is a diagram for illustrating exemplary embodiments of a virtual machine server and a virtual machine node.

Referring to FIG. 6, the virtual machine server 610 includes an index information generating unit 611 generating index information of blocks for booting a virtual machine in a virtual machine image, a list information generating unit 613 generating list information of neighboring nodes 630 and 640 with respect to a target node 620, and a transferring unit 615 transferring the index information and the list information to the target node 620. Herein, the booting of the virtual machine may include system booting of the virtual machine.

The index information may include sequence information of blocks required for booting the virtual machine and the sequence information may include sequential information on the positions of blocks read at the time of booting the virtual machine image through an emulator.

The index information generating unit 611 may be implemented by a processor for arithmetically operating data under a general computing environment and a memory capable of loading and processing data required for a job. As necessary, the index information generating unit 611 may include a recording medium storing the generated index information.

The list information may be generated based on a measurement value of a round trip time (RTT) for nodes that access the virtual machine server 610.

The list information generating unit 613 may also be implemented by a processor for arithmetically operating data under a general computing environment and a memory capable of loading and processing data required for a job. As necessary, the list information generating unit 613 may include a recording medium storing the generated list information.

The target node 620 may receive the blocks for booting the virtual machine from the neighboring nodes 630 and 640 in sequence according to the index information and the list information and the received blocks may be received from the virtual machine server 610 and the neighboring nodes 630 and 640 in the sequential streaming format.

The neighboring nodes 630 and 640 may include a node that accesses the virtual machine server 610 to boot the virtual machine.

Referring to FIG. 6, the virtual machine node 620 includes a receiving unit 621 receiving the list information of the neighboring nodes 630 and 640 from the virtual machine server 610 and receiving the blocks used to boot the virtual machine from the neighboring nodes 630 and 640 based on the list information and a booting processing unit 623 booting the virtual machine by using the received blocks.

The receiving unit 621 may be implemented by a processor for arithmetically operating data under a general computing environment and a memory capable of loading and processing data required for a job. As necessary, the receiving unit 621 may include a recording medium storing the received list information and the received blocks.

The booting processing unit 623 may also be implemented by a processor for arithmetically operating data under a general computing environment and a memory capable of loading and processing data required for a job. As necessary, the receiving unit 621 may include a recording medium storing the received blocks.

The receiving unit 621 may receive the index information of the sequential blocks for booting the virtual machine in the virtual machine image. Herein, the booting of the virtual machine may include system booting of the virtual machine.

The index information may include sequence information of blocks required for booting the virtual machine and herein, the sequence information may include sequential information on the positions of blocks read at the time of booting a virtual machine image through an emulator.

The list information may be generated based on a measurement value of a round trip time (RTT) for nodes that access the virtual machine server.

The receiving unit 621 may receive the blocks for booting the virtual machine from the neighboring nodes 630 and 640 in sequence according to the index information and the list information and the received blocks may be received from the neighboring nodes 630 and 640 in the sequential streaming format.

The neighboring nodes 630 and 640 may include a node that accesses the virtual machine server 610 to boot the virtual machine.

A detailed description of the virtual machine server and nodes and the operating methods thereof described in FIGS. 5 and 6 is the same as that of FIGS. 1 to 4, and as a result, the detailed description will be omitted.

Figure 7:
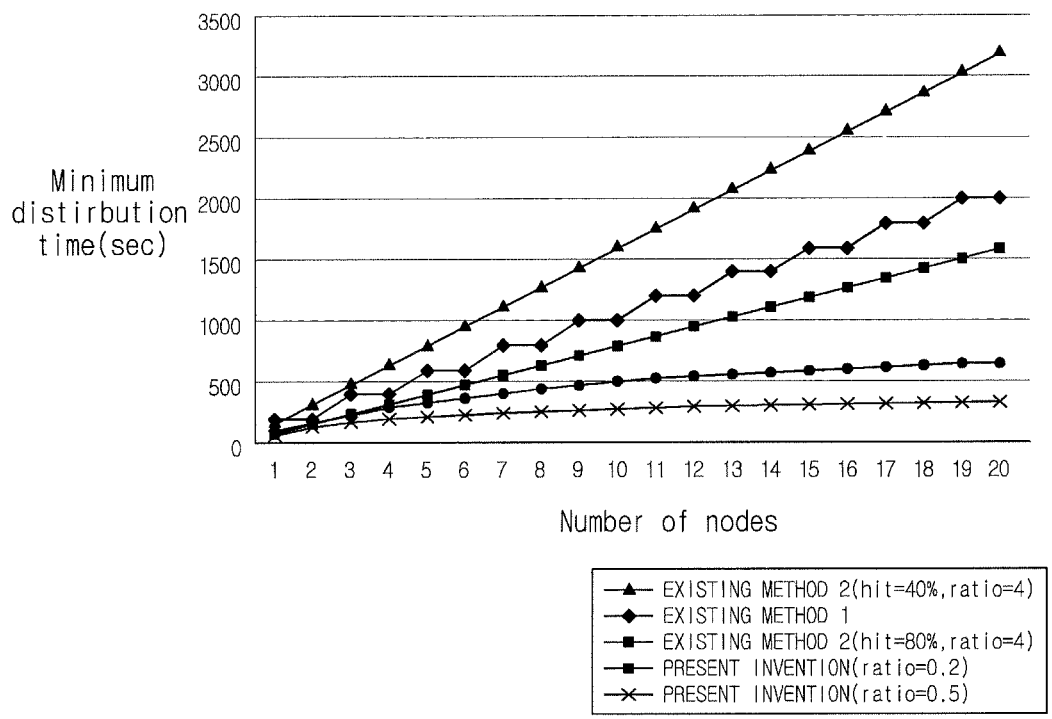
FIG. 7 is a graph illustrating the comparison in performance between the present invention and the existing method.

FIG. 7 is a graph illustrating the comparison in performance between the present invention and the existing method.

A performance model value of the protocol presented by the present invention is shown in [Table 3].

TABLE 3

| | |
|---|---|
| $F_{(file\ size)}$ | 10000 |
| $U_s$ | 50 |
| $U_p$ | 250 (ratio = 5) |
| $U_{neighbor}$ | 25 (ratio = 0.5), 10 (ratio = 0.2) |
| $\rho_{(cache\ hit)}$ | 40%, 80% |
| $N_{(number\ of\ nodes)}$ | 1~20 |

A minimum booting time is represented by Tmin, the size to be transferred is represented by F, the download performance of a predetermined node is represented by Di, the upload performance of the image disk server is represented by Us, and the number of simultaneously accessing nodes is represented by N.

In existing method 1, a time required for multiple nodes to download and booting the same image in one image server is shown in Equation 1 and this is an example of a general unicast type.

$$T_{min} = \frac{F}{\min\{D_i,\ U_s/N\}} \qquad [\text{Equation 1}]$$

In existing method 2, when a distant image server exists, a method for reducing a transferring load of the distant image server with a proxy server Up is shown in Equation 2. This is an example of general proxy type transferring.

$$T_{min} = (1-\rho)\left\{\frac{F}{\min\{D_i,\ U_s/N\}} + \frac{F}{\min\{D_i,\ U_p/N\}}\right\} + \rho\frac{F}{\min\{D_i,\ U_p/N\}} \qquad [\text{Equation 2}]$$

In the present invention, since a booting image is received from both the image server and the neighboring nodes in transferring, an equation for a booting time shown in Equation 3 may be obtained.

$$T_{min} = \frac{F}{\min\left\{D_i,\ \frac{N*U_{neighbors}+U_s}{N},\ U_s\right\}}$$

FIG. 7 is a graph acquired by substituting predetermined values through three transferring models, respectively. In the method of the present invention, it can be seen that the minimum booting time is achieved as the number of user nodes receiving the virtual machine is more increased than the existing method.

Meanwhile, the exemplary embodiments of the present invention can be prepared by a program which is executable in a computer and implemented in a general purpose digital computer operating the program by using a computer readable recording medium. The computer readable recording medium includes magnetic storage media (e.g., a ROM, a floppy disk, a hard disk, and the like) and storage media such as optical reading media (e.g., a CD-ROM, a DVD, and the like).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An operating method, comprising:
generating index information of blocks for booting a virtual machine, the index information indicating a reading pattern of a virtual machine image during a booting sequence;
generating list information of neighboring nodes for a target node; and
transferring, from a virtual machine server to the target node, the index information and the list information,
wherein the index information comprises reordering blocks in the virtual machine image, such that two blocks separated prior to the reordering are disposed directly adjacent to one another after the reordering,
wherein the virtual machine is booted using received blocks while sequentially receiving more blocks from the neighboring nodes, and
wherein the list information is generated based on a round trip time (RTT) for nodes configured to access the virtual machine server.

2. The operating method of claim 1, wherein the index information comprises sequence information of the blocks required for booting the virtual machine.

3. The operating method of claim 2, wherein the sequence information comprises sequential information on positions of the blocks obtained at a time of booting the virtual machine image through an emulator.

4. The operating method of claim 1, wherein the target node is configured to sequentially receive the blocks for booting the virtual machine from the neighboring nodes according to the index information and the list information.

5. The operating method of claim 4, wherein the received blocks are received from the virtual machine server and the neighboring nodes in a sequential streaming format.

6. The operating method of claim 1, wherein the neighboring nodes comprise a node configured to access the virtual machine server to boot the virtual machine.

7. The operating method of claim 6, wherein the booting of the virtual machine comprises system booting of the virtual machine.

8. A virtual machine server, comprising:
an index information generating unit configured to generate index information of blocks for booting a virtual machine, the index information indicating a reading pattern of a virtual machine image during a booting sequence;

a list information generating unit configured to generate list information of neighboring nodes for a target node; and a transferring unit configured to transfer the index information and the list information to the target node, wherein the index information comprises reordering blocks in the virtual machine image, such that two blocks separated prior to the reordering are disposed directly adjacent to one another after the reordering, wherein the virtual machine is booted using received blocks while sequentially receiving more blocks from the neighboring nodes, and wherein the list information is generated based on a round trip time (RTT) for nodes configured to access the virtual machine server.

9. An operating method, comprising:

receiving index information of sequential blocks for booting a virtual machine, the index information indicating a reading pattern of a virtual machine image during a booting sequence;

receiving list information of neighboring nodes from a virtual machine server;

receiving blocks used to boot the virtual machine from the neighboring nodes based on the list information and the index information; and booting the virtual machine by using the received blocks, while sequentially receiving more blocks from the neighboring nodes, wherein the index information comprises reordering blocks in the virtual machine image, such that two blocks separated prior to the reordering are disposed directly adjacent to one another after the reordering wherein the list information is generated based on a round trip time (RTT) for nodes configured to access the virtual machine serve.

10. The operating method of claim 9, wherein the index information comprises sequence information of the blocks required for booting the virtual machine.

11. The operating method of claim 10, wherein the sequence information comprises sequential information on positions of the blocks obtained at a time of booting the virtual machine image through an emulator.

12. The operating method of claim 9, wherein receiving the blocks comprises sequentially receiving the blocks for booting the virtual machine from the neighboring nodes according to the index information and the list information.

13. The operating method of claim 12, wherein the received blocks are received from the neighboring nodes in a sequential streaming format.

14. The operating method of claim 9, wherein the neighboring nodes comprise a node configured to access the virtual machine server to boot the virtual machine.

15. A virtual machine node, comprising:

at least one processor; and at least one memory comprising computer code, the at least one memory and the computer code configured to, with the at least one processor, cause the virtual machine node at least to:

receive index information of sequential blocks for booting a virtual machine, the index information indicating a reading pattern of a virtual machine image during a booting sequence;

receive list information of neighboring nodes from a virtual machine server;

receive blocks used to boot the virtual machine from the neighboring nodes based on the list information and the index information; and boot a virtual machine by using the received blocks, while sequentially receiving more blocks from the neighboring nodes, wherein the index information comprises reordering blocks in the virtual machine image, such that two blocks separated prior to the reordering are disposed directly adjacent to one another after the reordering, wherein the list information is generated based on a round trip time (RTT) for nodes configured to access the virtual machine serve.

* * * * *